May 22, 1934.   P. EHRMANN   1,959,527
ELECTRIC MACHINE WITH LAMINATED MASSES
Filed May 17, 1932   6 Sheets-Sheet 1

Inventor:
Paul Ehrmann,
By Arthur ...
Atty.

May 22, 1934.     P. EHRMANN     1,959,527
ELECTRIC MACHINE WITH LAMINATED MASSES
Filed May 17, 1932     6 Sheets-Sheet 3
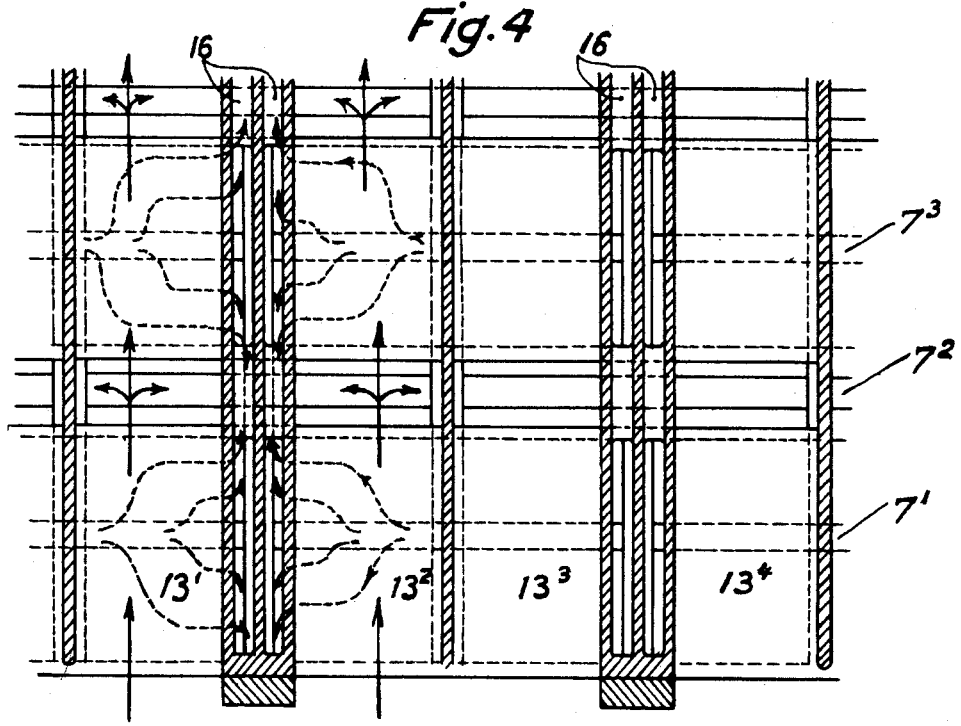
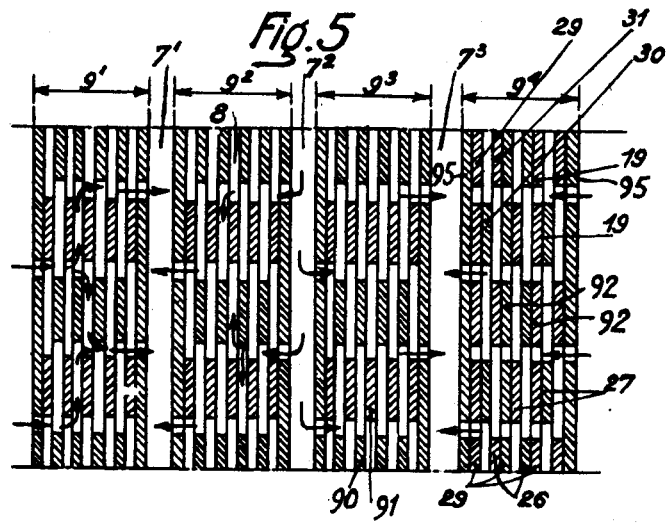
Inventor:
Paul Ehrmann May 22, 1934.     P. EHRMANN     1,959,527
ELECTRIC MACHINE WITH LAMINATED MASSES
Filed May 17, 1932     6 Sheets-Sheet 4
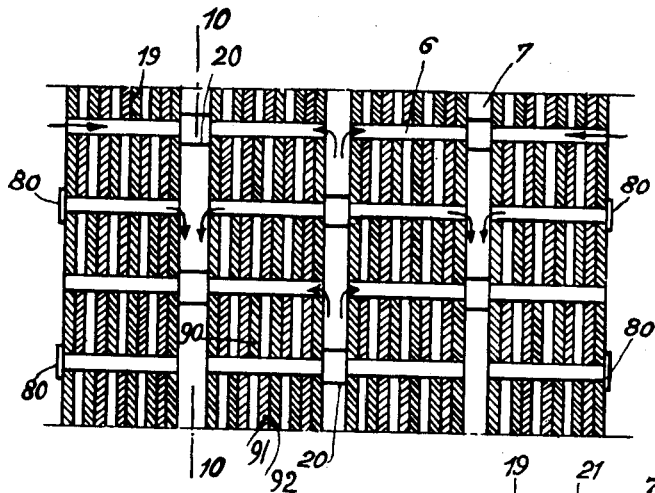
Fig. 9.
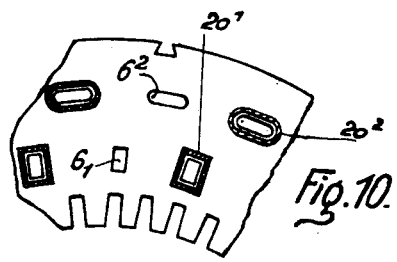
Fig. 10.
Fig. 11.
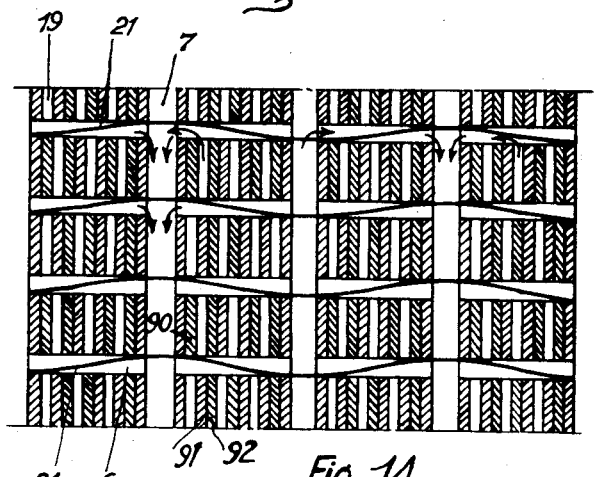
Fig. 14.
Fig. 13
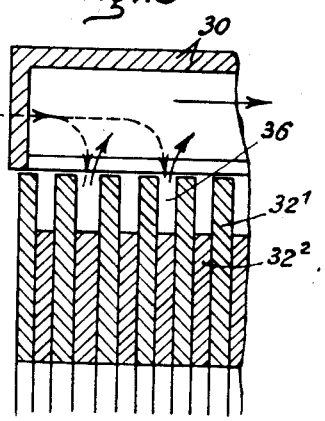
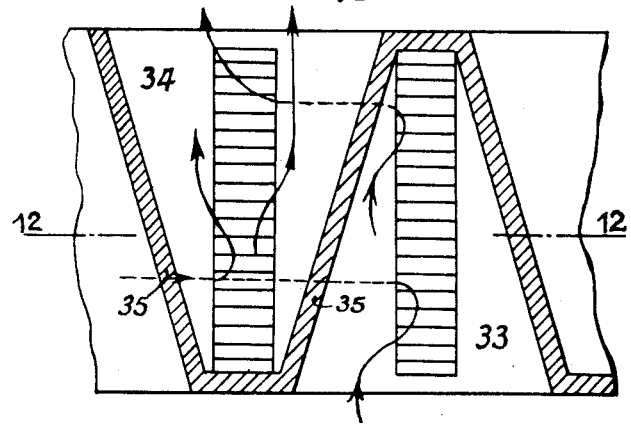
Inventor:
Paul Ehrmann,

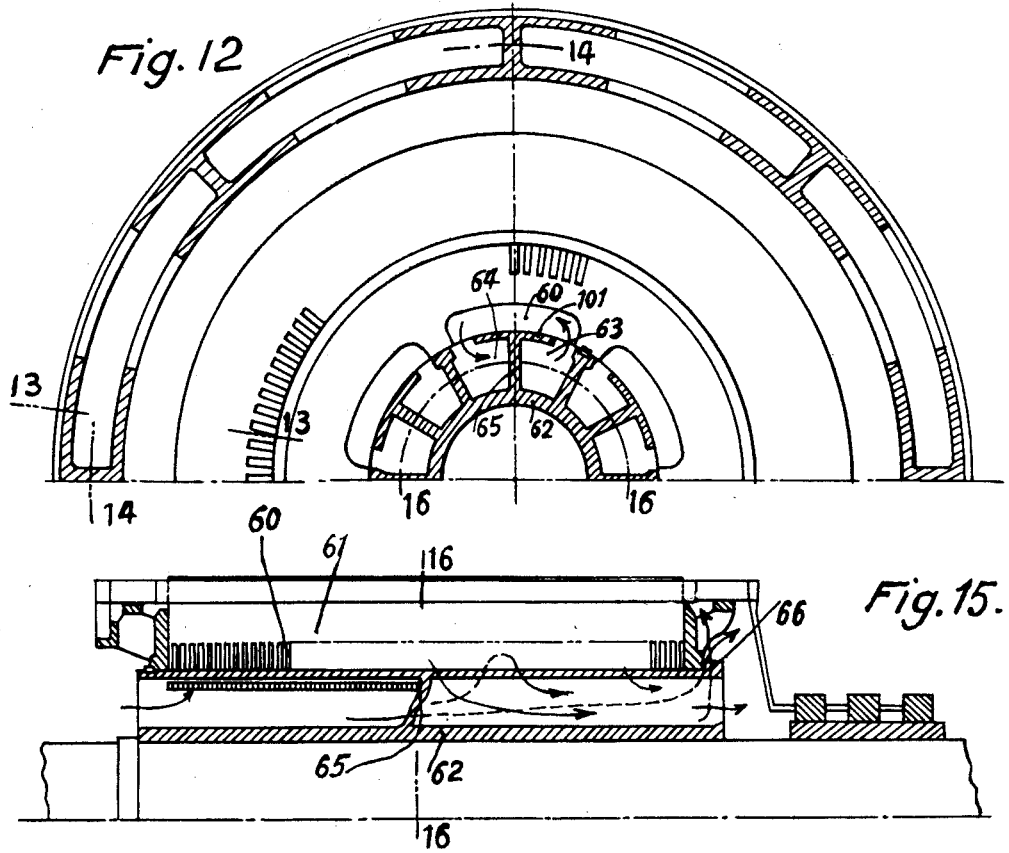
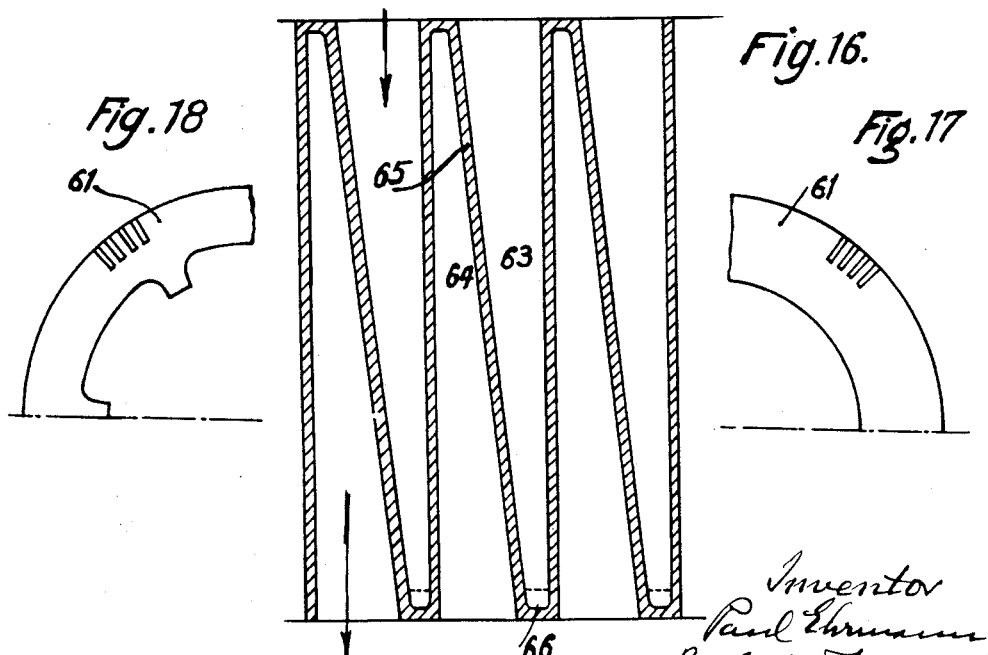

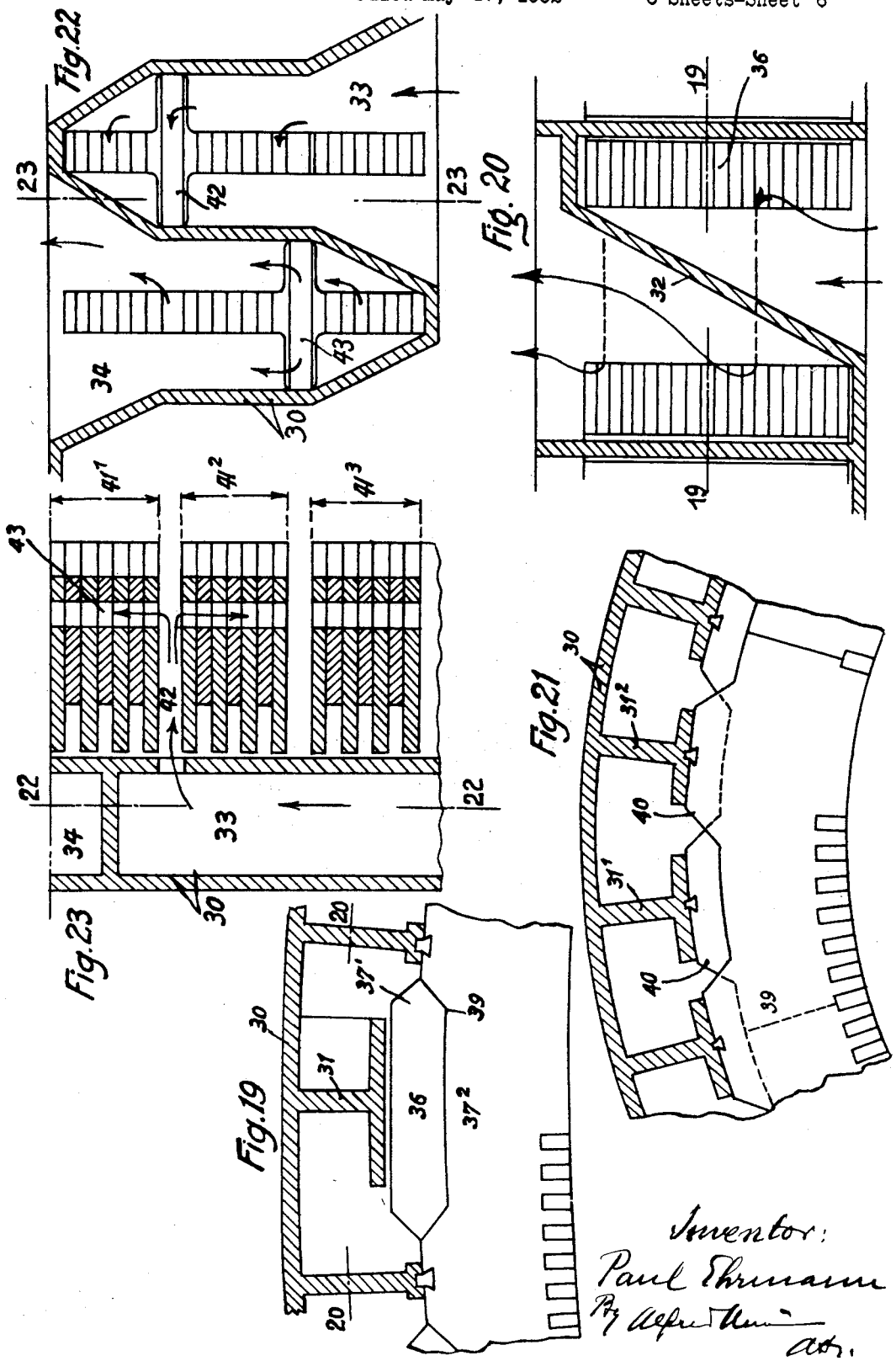

Patented May 22, 1934

1,959,527

UNITED STATES PATENT OFFICE 1,959,527

ELECTRIC MACHINE WITH LAMINATED MASSES

Paul Ehrmann, Paris, France

Application May 17, 1932, Serial No. 611,824
In France May 19, 1931

8 Claims. (Cl. 171—252)

My invention relates to the construction of electric machines with laminated masses, and has for its object to ensure the cooling under the best conditions of efficiency without hindering the passage of the magnetic flux, the electric machine preserving an optimum output and being of reduced bulk.

In regard to the passage of the magnetic flux within the laminated mass, it is appropriate to make the following remarks:

1. If, in a laminated mass of an electric machine, the flux is generally parallel with the laminæ and does not comprise (intentionally on the part of the constructor) any axial component normal to the laminæ, laminæ having different shapes and disposed in such manner that a part of the magnetic flux is conducted to pass to avoid a constriction from one group of laminæ to a neighbouring group, can however be employed without practically appreciable supplementary losses being involved, on condition of suitably limiting the thickness of each of the groups constituted by like laminæ and the distance apart of the sections of passage offered to the flux for each of the two forms of laminæ.

2. The laminated cores of rotary electric machines are subjected to the influence of a variable magnetic field of which the radial component varies in a straight line fashion in departing from the active zone of the slots, whereas the tangential component is almost constant throughout the entire cross section of the core.

The present invention is based particularly on the above observations relative to the direction of the magnetic flux relatively to the laminæ, and its object is to spread a network of air circulation of large cooling surface in such a manner as to hinder as little as possible the circulation of the flux and to utilize from the magnetic point of view the entire weight of the laminæ incorporated.

Electric machines enabling the above objects to be realized, have the features set forth in the following description and specified in the annexed claims.

Electric machines improved according to this invention are illustrated by way of example on the accompanying drawings, in which:—

Fig. 4 is a developed cylindrical section along the line 4—4 in Fig. 2.

Fig. 5 is a developed cylindrical section along the line 5—5 in Fig. 2.

Figs. 6 and 7 are fragmentary views of two laminæ entering into the constitution of the stator of Figs. 1 to 5.

Fig. 8 is a partial fragmentary plan of another lamina which may enter into the constitution of such stator.

Fig. 9 is a developed cylindrical section of another stator according to a modification of the core of Fig. 5.

Fig. 10 is a partial transverse section of this stator along the line 10—10 of Fig. 9.

Fig. 11 is a developed cylindrical section of another stator according to a modification of the core of Fig. 5.

Fig. 12 is a partial transverse section of another electric machine according to the invention.

Fig. 13 is an axial section along the line 13—13 in Fig. 12.

Fig. 14 is a developed section of the stator along the line 14—14 in Fig. 12.

Fig. 15 is a half longitudinal section of the rotor of the machine of Fig. 12.

Fig. 16 is a developed cylindrical section of such rotor along the line 16—16 in Fig. 12.

Figs. 17 and 18 are two partial elevations of two laminæ entering into the constitution of such rotor.

Fig. 19 is a partial transverse section along the line 19—19 in Fig. 20, of a modification of the stator of Figs. 12 to 14.

Fig. 20 is a developed section of such stator along the line 20—20 in Fig. 19.

Fig. 21 is a partial transverse section of another modification of the stator of Figs. 12 to 14.

Fig. 22 is a developed section along the line 22—22 in Fig. 23, of another stator according to the invention.

Fig. 23 is an axial section of such stator along the line 23—23 in Fig. 22.

Figure 1:
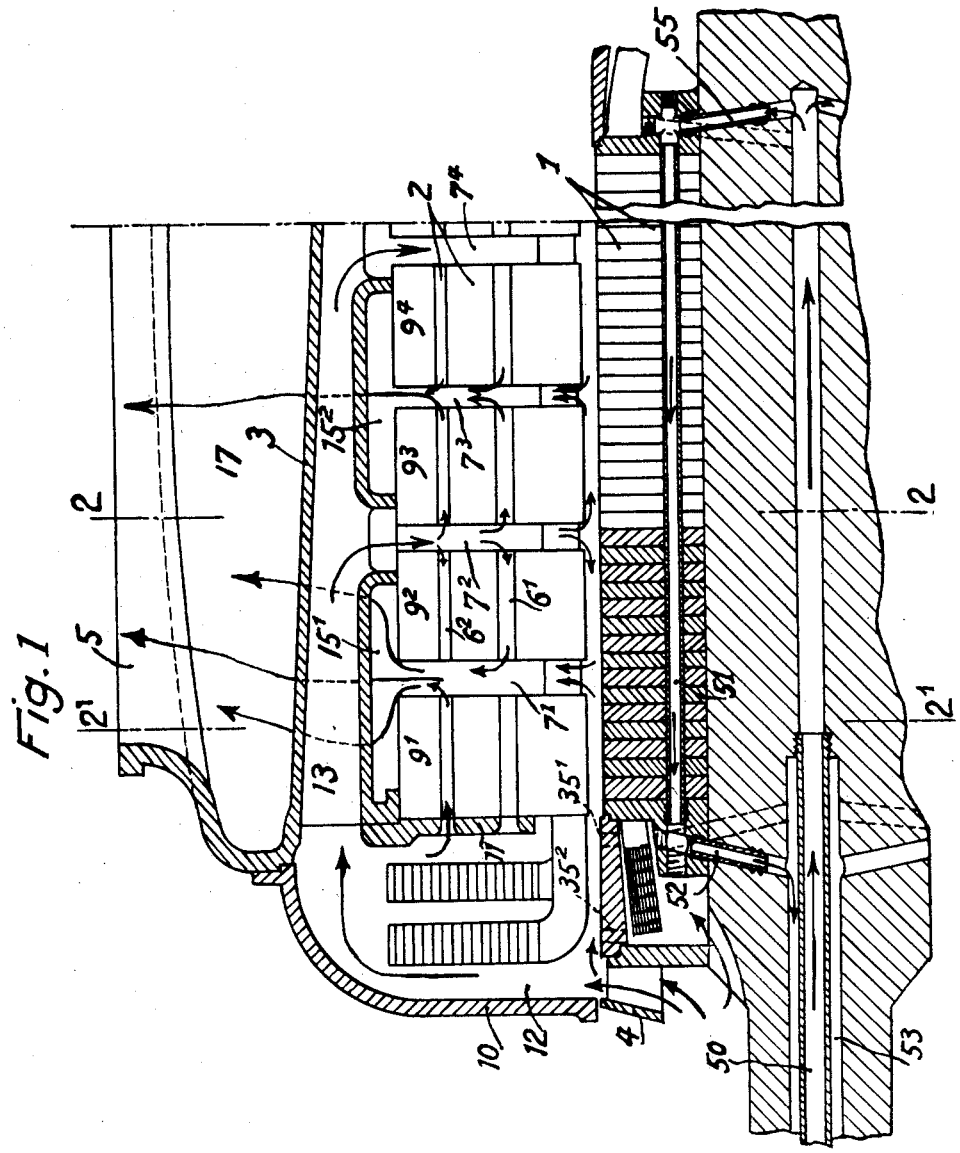
Fig. 1 is a longitudinal axial section of a turbo-alternator according to the invention.
Figure 2:
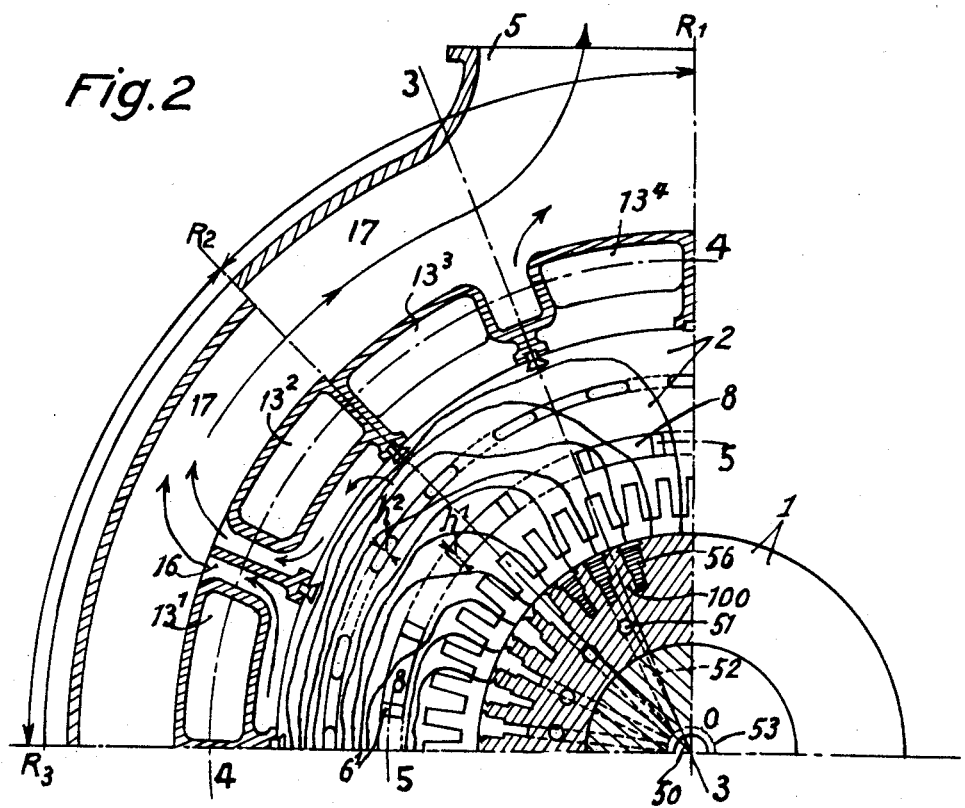
Fig. 2 is a partial transverse section consisting of a first sector $R_1$ $OR_2$ taken along the line 2—2 in Fig. 1, and a second sector $R^2$ $OR^3$ taken along the line 2' 2' in Fig. 1.
Figure 3:
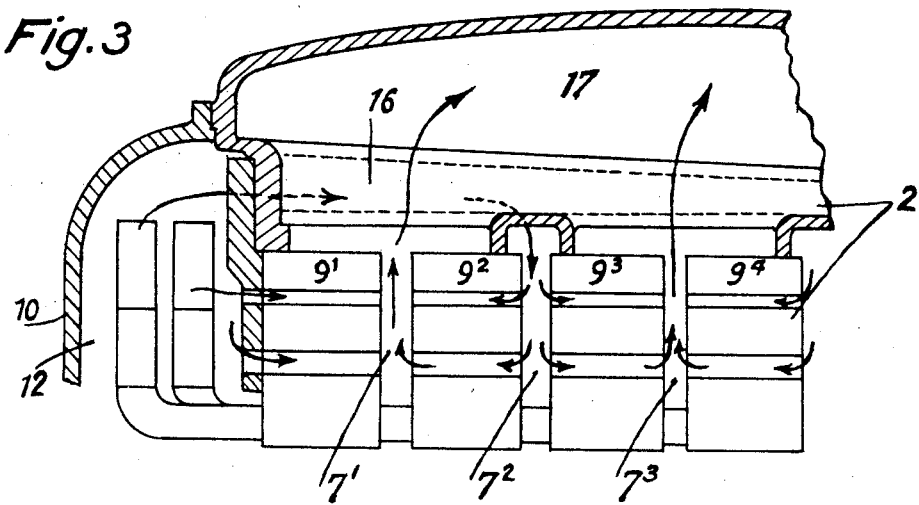
Fig. 3 is a partial longitudinal section along the line 3—3 in Fig. 2.

The electric machine illustrated in Figs. 1 to 5, comprises a rotor 1 rotating within a stator 2 stationary in a casing 3.

The rotor 1 drives a fan 4 blowing fresh air for cooling the members of the machine, whilst one or several openings 5 formed in the casing 3 ensure the outlet of hot air.

The circulation of the cooling air inside the laminated mass constituting the stator 2 is ensured by axial ducts 6, that is to say, ducts parallel to the axis of the machine and radial ducts 7, that is to say, ducts perpendicular to such axis.

The axial ducts $6^1$ $6^2$ are formed by disposing a main lamina 92 (Fig. 8) between an intercalary lamina 90 (Fig. 6) and another intercalary lamina 91 (Fig. 7). The intercalary laminæ 90, 91 have very elongated apertures, which, by their superposition on the apertures of the laminæ 92, constitute the axial ducts $6^1$ $6^2$, as well as the lamellar ducts parallel with the plane of the laminæ (Fig. 5).

Outer laminæ 95 (Fig. 5) are applied to each pack of laminæ of the stator and obstruct one axial duct of two.

The axial ducts $6^1$ $6^2$ open by each of their ends into radial ducts 7 which are formed between the successive packs of laminæ $9^1$ $9^2$ $9^3$.

The axial ducts 6 formed in each pack of laminæ $9^1$ $9^2$ are disposed mutually parallel and are distributed at distances more or less remote from the active region of the slots of the stator.

The axial ducts $6^1$ $6^2$ of equal sectional area of flow of fluid, have heights $h_1$ $h_2$ in the radial direction, such that the height $h_1$ of the duct $6^1$ adjoining the active region of the slots is considerable, whereas the height $h_2$ of the duct $6^2$ further from such active region is reduced. This disposition thus conduces to impart to the duct $6^1$ a restrained peripheral length $l_1$ and in consequence to leave between each group of two ducts $6^1$ adjoining the active region large metallic paths $L_1$ for the radial component of the magnetic flux which is a maximum in this region.

On the contrary, the radial component of the magnetic flux reduces itself more and more in getting more distant from the slots; in consequence, the width of the metallic path provided between two successive ducts $6^2$ can be reduced without hindering the passage of the flux, and in consequence increased peripheral length can be imparted to the ducts $6^2$, the reduction of the height $h_2$ leaves more section free for the passage of the tangential component of the flux. On the one hand, the ducts of elongated section have more surface and in consequence promote cooling conditions.

Moreover, this arrangement ensures a very effective internal cooling and enables in consequence the thickness of the packs of laminæ constituting the laminated mass to be increased and the number of radial ventilation ducts to be diminished.

The various axial ducts $6^1$ at equal distance from the axis and likewise the axial ducts $6^2$ are interconnected by lamellar ducts 8 produced by superposing alternately laminæ or groups of laminæ (Figs. 6 and 7) as has been explained above. This particular combination, that is to say the combination on the one hand of the axial ducts ($6^1$ $6^2$) the radial heights $h^1$ $h^2$ of which vary according to the distance of these ducts from the axis and on the other hand lamellar ducts 8 parallel to the planes of the laminæ and joining two by two the axial ducts $6^1$ $6^2$ enable the sections of passage to be adjusted to the values of the radial and tangential fluxes in each region of the core.

However, a laminated core of an electric machine according to the invention and comprising axial ducts without lamellar ducts can be constructed. For this it suffices to superpose on one another laminæ 92 like those of Fig. 8.

The circulation of the cooling fluid of the stator is as follows:—

The air blown by the fan 4 or by an independent fan passes into the space provided between the cover 10 and the clamping plate 11 of the packs of laminæ $9^1$ $9^2$. The free space forming a chamber 12, supplies axial trunks $13^1$ $13^2$ $13^3$ supplying cold air which themselves supply the radial duct pairs $7^2$ $7^4$ provided between the packs of laminæ and opening over almost the whole of the periphery of such laminæ.

The cold air passes thus from these radial ducts $7^2$ $7^4$ into the axial ducts $6^1$ $6^2$ in order to cool the laminæ. Eventually, the heated air is discharged by the odd radial ducts $7^1$ $7^3$ which open over all the periphery of the laminated core of the stator. The air arrives at last at the hot air trunks $15^1$ $15^2$. These hot air trunks $15^1$ $15^2$ communicate by conduits 16 formed between the walls of the cold air trunks $13^1$ $13^2$ with an annular chamber 17 so that the hot air reaching this chamber is discharged to the exterior by openings 5.

The ducts $6^1$ $6^2$ open alternately from one part and another of the packs of laminæ $9^1$ $9^2$, as indicated in Figs. 1 and 5 and thus ensure the communication of a radial duct 7 for the entry of cold air with the adjacent ducts $7^1$ and $7^3$ for the outlet of hot air.

The orifices by which the internal ducts open at the free end surface of a pack are staggered relatively to the corresponding orifices of the succeeding pack, Fig. 5. This disposition thus avoids the currents of air opposing one another which would cause supplementary charging losses.

The distribution of cooling air by an inlet trunk surrounding the laminated mass (Fig. 1) enables the volume of air admitted into the ducts of such laminated mass to be appreciably increased, which ensures the cooling of the mass in an effective manner. Moreover, the axial ducts and the lamellar ducts which add their effects to those of the radial ducts, in consequence of the effectiveness of the cooling obtained enable the thickness of each pack to be increased and the number of the radial ducts to be reduced, and to permit in consequence the individual supply of each radial duct as is clearly shown in Fig. 1.

It is to be observed also that the current of cold air admitted at 13 (Fig. 1) circulates as a whole in a generally axial direction, whereas the current of air after having cooled the packs of laminæ and having there been heated, circulates in a direction which as a whole is in a plane perpendicular to the axis, so that these two portions of the cooling air circuit are appreciably at right angles to each other (Fig. 4), which reduces the entire bulk and facilitates the complete circuit being traced with a constant section.

Moreover, one part of the cold current of air conducted by the trunks $13^1$ $13^2$ into the radial ducts $7^2$ $7^4$ traverses these radial ducts in order to cool the inter-iron region before passing into the radial outlets ducts $7^1$ $7^3$.

The machine illustrated in Figs. 1 to 5 comprises a rotor which is cooled by water circulation. This circulation comprises a conduit 50 for the supply of cold water provided in the shaft of the rotor. This main axial duct 50 supplies by radial ducts 55 elementary peripheral ducts 51 located at the base of the slots of the rotor.

The hot water is collected by radial ducts 52 in a trunk 53 concentric with the inlet conduit 50.

The radial ducts 55 and 52 branching respectively from the cold water trunk 50 and from the hot water trunk 51 are joined to these trunks at different inclinations, which permits a very large number of radial ducts 55 or 52 to be bored through a rotor, without the joints of these ducts overlapping one another.

Thus, the effective cooling of the rotor is ensured and in particular the cooling of the active zone of the slots.

In order still further to increase the effectiveness of the cooling, the slots 56 of the rotor which contain the winding have narrowed bases which thus provide between them increased metallic sections 100 and facilitate the transmission of heat to the neighbouring ducts 51 in which the cooling water circulates. Moreover, as it is advantageous to form the rotor of a core constituted by discs threaded on a shaft, the fluid tightness of the axial circulation ducts is effected by tubes inserted into the holes and then expanded by internal pressure or by a tube expander, which ensures good thermal contact between the wall of the tube and the metal of the discs and the complete fluid tightness at the ends.

Numerous modifications can be made in the machine described above by way of example. In particular, as regards the stator, it is advantageous to suppress the end laminae arranged on each pack $9^1$ $9^2$ and which have for their purpose to ensure the circulation of the cold air into the lamellar ducts 19 (Fig. 5). According to a modification of the invention (Figs. 9 and 10), these end laminae are replaced by removable plates 80 and by rings 20 interposed between the successive packs $9^1$ $9^2$ of laminae, at the ends of the axial ducts, in such a manner that two opposed ducts can be traversed by currents of opposite directions which supply the lamellar ducts. This arrangement thus prevents any direct communication between the axial cold air ducts and the radial hot air outlet duct and inversely. Moreover, this arrangement permits the easy cleaning of these axial ducts throughout their entire length. Indeed, nozzles blowing air can be passed easily from one end to the other of the axial ducts $6^1$ $6^2$ to clean these ducts 6 as well as the lamellar ducts 19. This blowing of cleaning air can easily be carried out with the modification of Figs. 9 and 10, although it would be impossible in the case of Fig. 5.

In the modification illustrated in Fig. 11, the axial ducts 6 are themselves divided into two compartments by an inclined partition 21. Thus is ensured a better distribution of the layers of cold air which arrive by an axial duct 6 and wipe the laminae in passing through the lamellar ducts 19 to escape finally by the adjacent axial duct 6. This arrangement causes the section of the ducts to vary in proportion to the delivery of the air which circulates therein. Because of this arrangement, a better utilization of the axial ducts is obtained which ensures with equality of section an increased delivery of air, each duct being at the inlet and outlet of its full section.

The inclined partitions of one and the same row of axial ducts are made integral with one another, which enables them to be easily withdrawn by sliding them along the row. The laminated mass can then be thoroughly cleaned without any difficulty.

In the preceding examples, it has been assumed that the electric machine comprises a stator core of great radial height under the particular form (Figs. 1 to 11), but the invention also extends to electric machines the stator core of which has a lesser radial height and which may be entirely or almost entirely cooled for the utilization of a peripheral zone which may form an integral active part of the magnetic circuit.

In a first embodiment of such a machine, illustrated in Figs. 12 to 14, the external carcase 30 has radial ribs $31^1$ $31^2$ $31^3$ against which bears the pack of laminae 32 forming the stator.

These radial ribs provide between themselves ducts 33 and 34 serving respectively for the admission of cold air and for the outlet of hot air. These ducts 33, 34 are divided by inclined partitions 35 (Fig. 14) which varies the section of passage offered to the current of air as a function of the delivery of such current of air.

In order to ensure the circulation from an inlet duct 33 to an outlet duct 34, the laminae $32^1$ $32^2$ constituting the core have different diameters and are alternately packed against one another in such manner as to provide free spaces 36 (Fig. 13) in which passes the current of air which thus ensures the cooling of the laminated core. The laminae of large diameter $32^2$ are simply held by squeezing against the first. A complete utilization of the laminae from the magnetic point of view is thus obtained.

Moreover, the peripheral length of the laminae utilized for cooling is increased and in consequence the radial height of the fins can be reduced, that is to say the difference between the diameters of the laminae $32^1$ $32^2$. The radial bulk is in consequence reduced to a minimum.

In addition, in this machine, the rotor (Fig. 15) is constituted by a laminated core comprising laminae 60 (Fig. 17) and laminae 61 (Fig. 18) packed alternately by units or by groups on a spider 62 (Fig. 12).

This spider 62 provides between its arms, cooling air inlet ducts 63 and hot air outlet ducts 64. These ducts 63 and 64 are on the one hand divided into two compartments by inclined partitions 65 which varies the section of passage for the air according to the delivery of such air and on the other hand are completed by a cylindrical wall 101.

The current of cold air blown at one end of the rotor into the axial ducts 63 spreads between the elementary ducts which the fins 60 (Fig. 15) form and the cylindrical wall 101 whereas the heated current of air passes into the ducts 64 in order to be discharged to the exterior.

The cold air inlet ducts 63 also have an end orifice 66 (Fig. 16) in order to allow a part of the current of cold air to pass freely which cools the heads of the winding bobbins.

In a first modification of the above machine, the laminated core of the stator is constituted by laminae $37^1$ $37^2$ having alternately a fin 38 and a notch 39 (Figs. 19 and 20) which provide between them free spaces such as 36 for the passage of the current of air.

The laminated core can also be constituted of like laminae 39 (Fig. 21) having end fins 40, these laminae being offset at a certain angle, in order still to provide between the space necessary for the free circulation of the current of air.

This particular means of cooling is interesting when the radial height of the stator is small, but when this radial height is considerable, it will be of advantage to combine with this external cooling arrangement any of the above described arrangements comprising internal circulation ducts for cooling fluid.

In the method of constructing this combined arrangement illustrated in Figs. 22 and 23, the laminated core constituting the stator comprises packs of laminae $41^2$ $41^3$ providing between them radial ducts 42 themselves supplying axial ducts 43 which themselves supply lamellar ducts.

The radial cold air inlet ducts 42 are themselves supplied with cold air by the ducts 33 provided in the outer carcase 30 of the stator, whereas the radial hot air outlet ducts 43 open into the hot air outlet ducts 34 of the carcase.

This circulation of fluid thus ensures under the best conditions the regular cooling of the stator in spite of its considerable radial height.

I claim:

1. In an electric machine, a carcase forming a casing, this carcase comprising a trunk for the inlet of cold air and a trunk for the outlet of hot air, a laminated core fixed in the carcase and having two sets of radial ducts opening at the exterior of the laminated core and axial ducts each connecting a radial duct of one of the sets with two radial ducts of the other set, means making one set of radial ducts communicate with the cold air inlet trunk, means making the other set of radial ducts communicate with the hot air outlet trunk, oblique partitions mounted in the axial ducts, means supplying air to the cold air inlet trunk, and a rotor rotating in the laminated core.

2. In an electric machine, a carcase forming a casing, this carcase comprising a trunk for the inlet of cold air and a trunk for the outlet of hot air, a laminated core fixed in the carcase and having two sets of radial ducts opening at the exterior of the laminated core and axial ducts connecting each radial duct of one set with two radial ducts of the other set, means making one set of radial ducts communicate with the cold air inlet trunk, means making the other set of radial ducts communicate with the hot air outlet trunk, oblique partitions mounted in the axial ducts, the oblique partitions of the axial ducts of the same axis being fast one with another, means supplying air to the cold air inlet trunk, and a rotor rotating in the laminated core.

3. In an electric machine, a carcase forming a casing, this carcase having radial partitions forming between them ducts and oblique partitions mounted in each duct of the carcase, a laminated core mounted in the carcase and constituted by packed laminæ providing between them peripheral ducts communicating with two successive ducts of the carcase, means for the circulation of air to the interior of the ducts of the carcase, and a rotor rotating in the laminated core.

4. In an electric machine, a carcase forming a casing, this carcase having radial partitions forming between them ducts and oblique partitions mounted in each duct of the carcase, a laminated core constituted by packed laminæ of different diameters, these laminæ also forming between them peripheral ducts communicating with two successive ducts of the carcase, means for the circulation of air to the interior of the ducts of the carcase, and a rotor rotating in the laminated core.

5. In an electric machine, a carcase forming a casing, this carcase having radial partitions forming between them ducts and oblique partitions mounted in each duct of the carcase, a laminated core constituted by packed laminæ having alternately fins and recesses, these laminæ also forming between them peripheral ducts communicating with two successive ducts of the carcase, means for the circulation of air to the interior of the ducts of the carcase, and a rotor rotating in the laminated core.

6. In an electric machine, a carcase forming a casing, this carcase having radial partitions forming between them ducts and oblique partitions mounted in each duct of the carcase, a laminated core mounted in the carcase and constituted by packed laminæ having fins offset angularly, these laminæ also forming between them peripheral ducts communicating with two successive ducts of the carcase, means for the circulation of air to the interior of the ducts of the carcase, and a rotor rotating in the laminated core.

7. In an electric machine, a carcase forming a casing, this carcase having radial partitions forming between them ducts and oblique partitions mounted in each duct of the carcase, a laminated core mounted in the carcase and constituted by packed laminæ forming between them peripheral ducts communicating with two successive ducts of the carcase, this core having likewise in its mass axial internal circulation ducts communicating with the ducts of the carcase, means for the circulation of air to the interior of the ducts of the carcase and to the interior of the ducts of the laminated core, and a rotor rotating in the laminated core.

8. In an electric machine, a stator, a rotor comprising a spider, the arms of this spider providing between them ducts for the circulation of air, laminæ packed on this spider and providing between them free spaces forming lamellar ducts communicating with two adjacent axial ducts of the spider, inclined partitions mounted between each arm of the spider and dividing into two parts the ducts of this spider, and means for the circulation of air in the ducts of the spider.

PAUL EHRMANN.